(12) United States Patent
Fleig et al.

(10) Patent No.: US 9,695,702 B2
(45) Date of Patent: *Jul. 4, 2017

(54) TURBINE, PARTICULARLY FOR AN EXHAUST GAS TURBOCHARGER, AND EXHAUST GAS TURBOCHARGER

(71) Applicant: Bosch Mahle Turbo Systems GmbH & Co. KG, Stuttgart (DE)

(72) Inventors: Claus Fleig, Ettenheim (DE); Matthias Stein, Korntal-Münchingen (DE); Timo Tries, Schwieberdingen (DE); Andreas Wengert, Auenwald (DE)

(73) Assignee: Bosch Mahle Turbo Systems GmbH & Co. KG (DE)

( * ) Notice: Subject to any disclaimer, the term of this patent is extended or adjusted under 35 U.S.C. 154(b) by 518 days.

This patent is subject to a terminal disclaimer.

(21) Appl. No.: 14/229,831

(22) Filed: Mar. 28, 2014

(65) Prior Publication Data

US 2014/0212306 A1    Jul. 31, 2014

Related U.S. Application Data

(63) Continuation of application No. 12/863,602, filed as application No. PCT/EP2009/050531 on Jan. 19, 2009, now Pat. No. 8,684,678.

(30) Foreign Application Priority Data

Jan. 21, 2008  (DE) .................. 10 2008 005 406
Mar. 20, 2008  (DE) .................. 10 2008 000 776

(51) Int. Cl.
*F01D 17/16*    (2006.01)
*F01D 9/04*    (2006.01)
(Continued)

(52) U.S. Cl.
CPC ............. *F01D 9/04* (2013.01); *F01D 17/165* (2013.01); *F01D 25/246* (2013.01); *F02C 6/12* (2013.01);
(Continued)

(58) Field of Classification Search
CPC ........ F01D 9/041; F01D 9/048; F01D 17/165; F01D 25/246; F05D 2240/128; F05D 2250/90
See application file for complete search history.

(56) References Cited

U.S. PATENT DOCUMENTS 4,324,526 A * 4/1982 Berchtold ............. F01D 17/167
                                                        415/147
2006/0034684 A1    2/2006 Metz et al.
2007/0071595 A1 * 3/2007 Mukherjee ............ F01D 17/165
                                                        415/165

FOREIGN PATENT DOCUMENTS

EP    1536103 A1    6/2005
EP    1816317 A2    8/2007
(Continued)

*Primary Examiner* — Ninh H Nguyen
(74) *Attorney, Agent, or Firm* — Fishman Stewart PLLC

(57) ABSTRACT

The invention relates to a turbine (1), in particular of an exhaust gas turbocharger, having a turbine rotor (4), which is rotatably mounted in a housing (2), with which at least one radial inlet channel (9) for a guide apparatus (7) forming a medium which drives the turbine rotor (4) is associated, wherein said guide apparatus (7) has multiple guide vane bearing rings (10), which radially enclose said turbine rotor (4) and have guide vanes (8) which lie in said inlet channel (9), and a guide vane cover ring (12), and wherein said inlet channel (9) is axially delimited by said guide vane bearing ring (10) and said guide vane cover ring (12) and said guide apparatus (7) is mounted in the housing (2) so it is axially and/or radially movable for material relaxation. Further- (Continued)

more, the invention relates to an exhaust gas turbocharger, in particular for a motor vehicle.

26 Claims, 12 Drawing Sheets

(51) Int. Cl.
*F02C 6/12* (2006.01)
*F01D 25/24* (2006.01)

(52) U.S. Cl.
CPC .... *F05D 2220/40* (2013.01); *F05D 2230/642* (2013.01); *F05D 2250/42* (2013.01)

(56) References Cited

FOREIGN PATENT DOCUMENTS

| WO | WO-2004/109063 A1 | 12/2004 |
| WO | WO-2007/046798 A1 | 4/2007 |

* cited by examiner

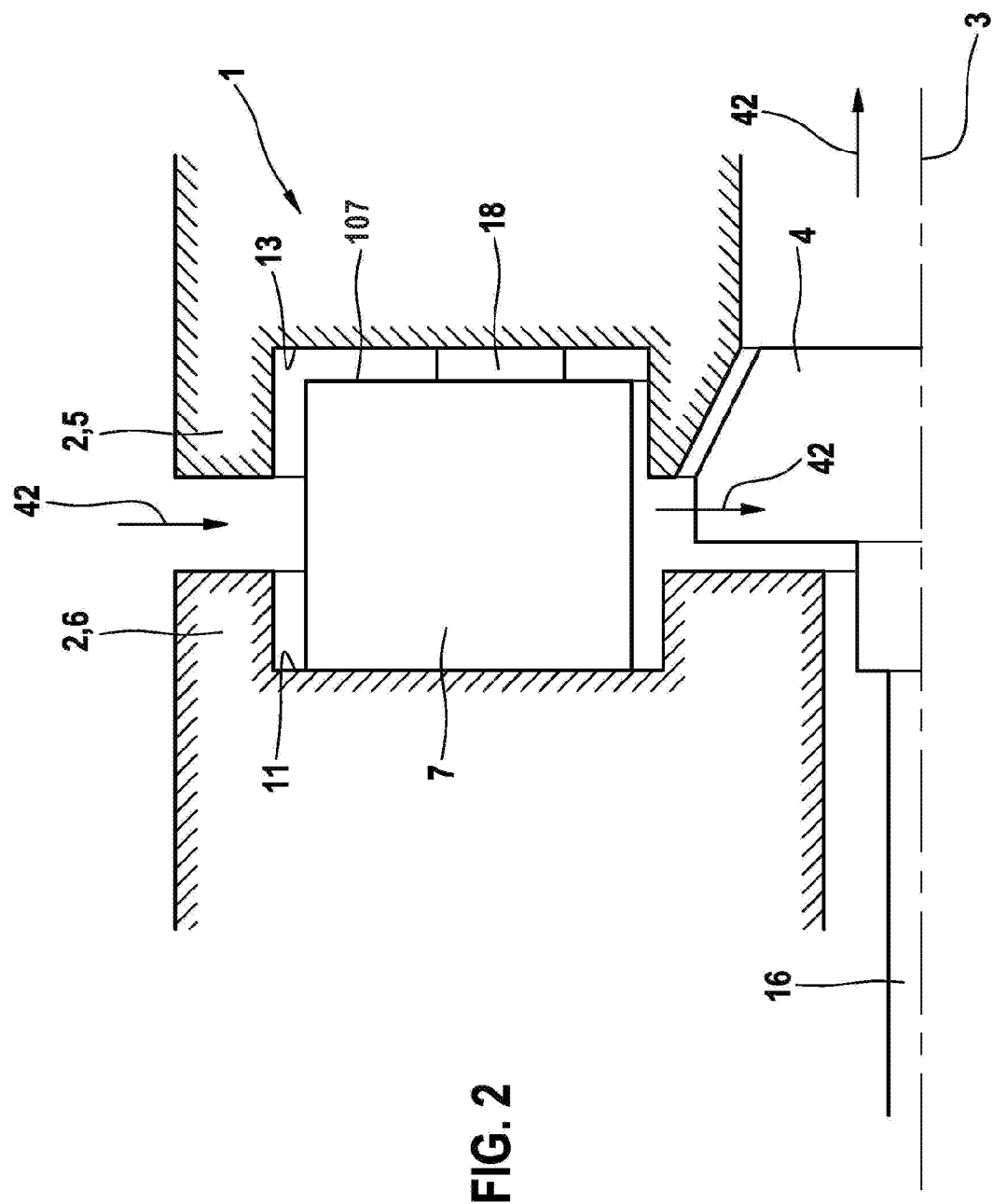

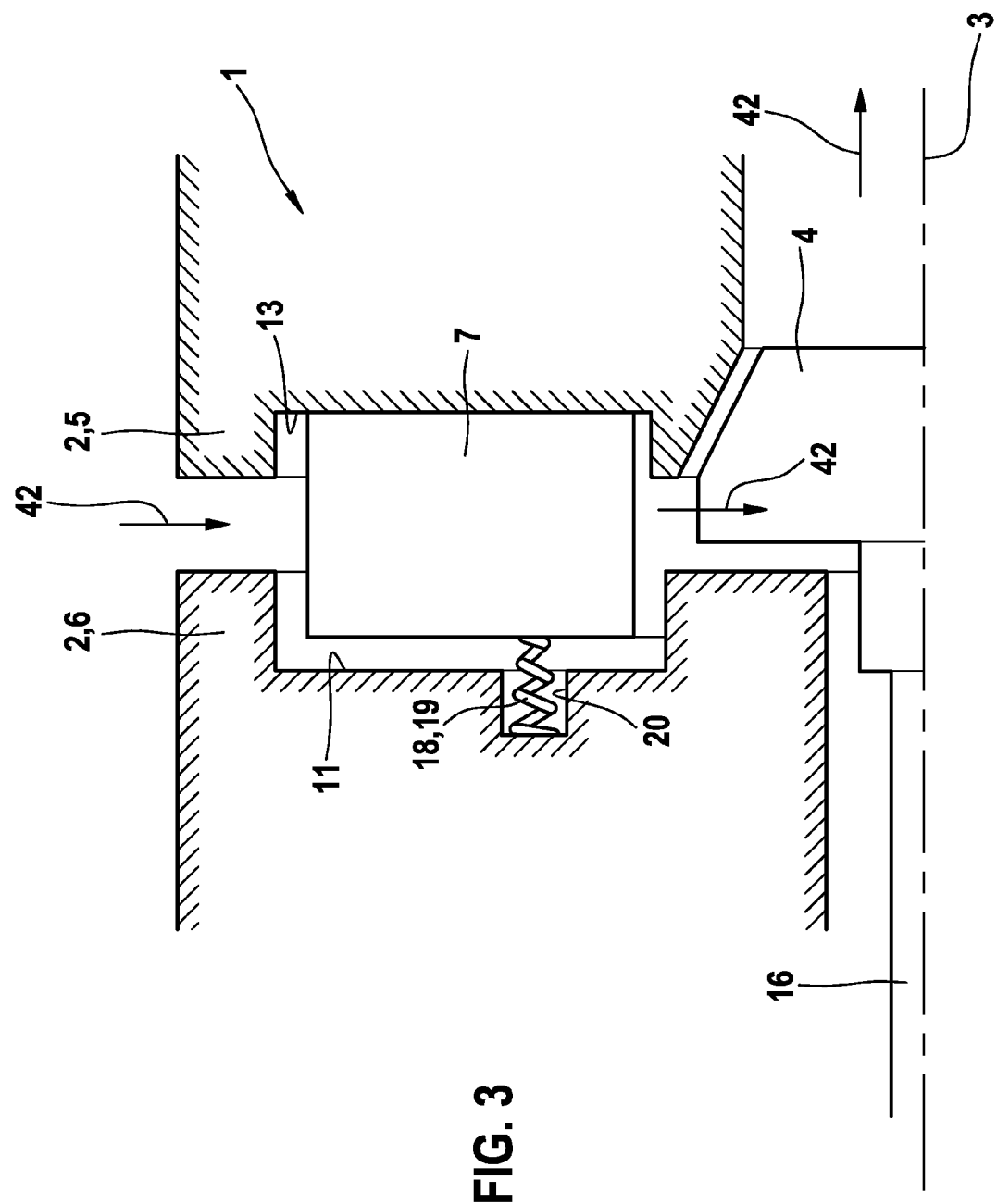

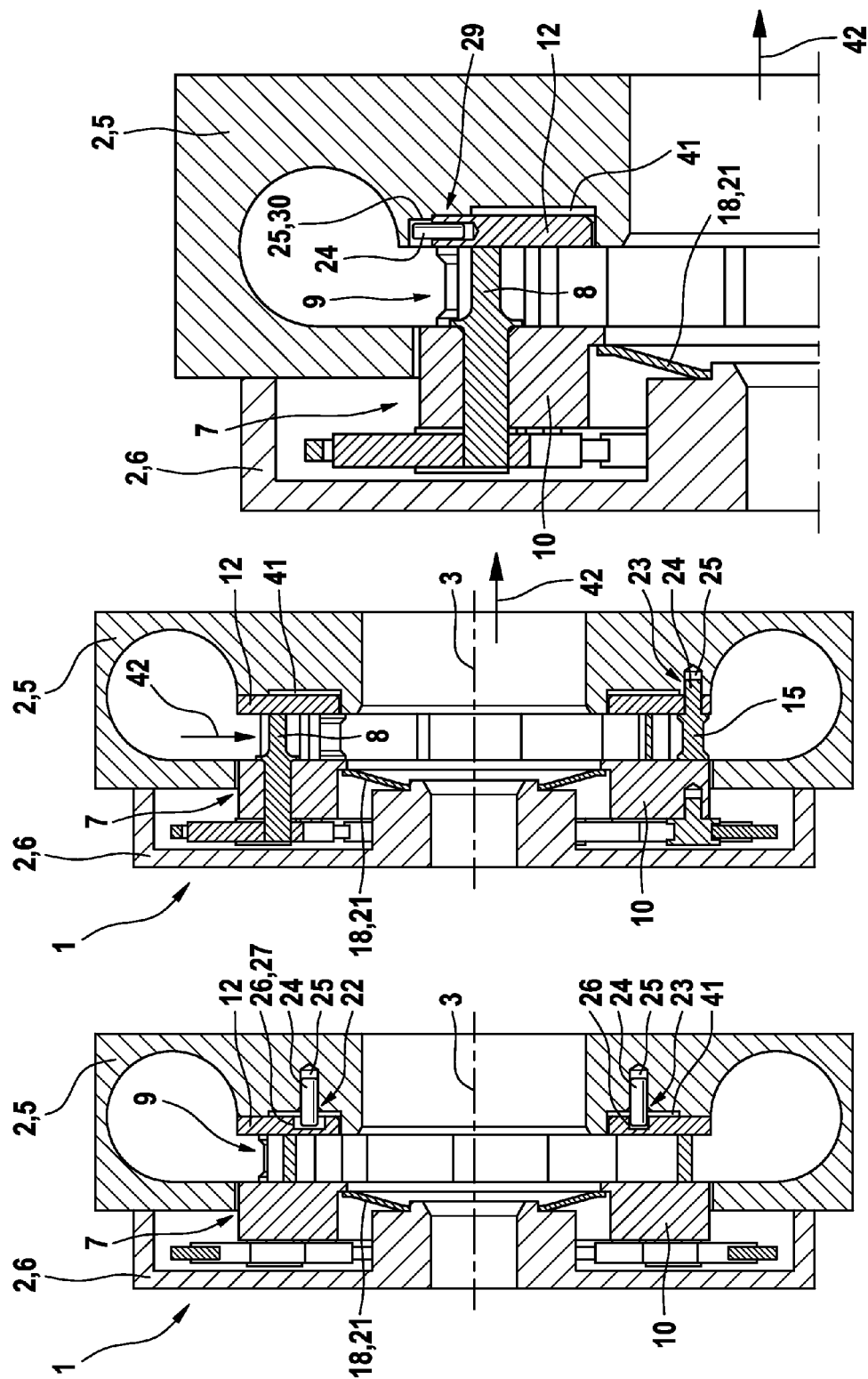

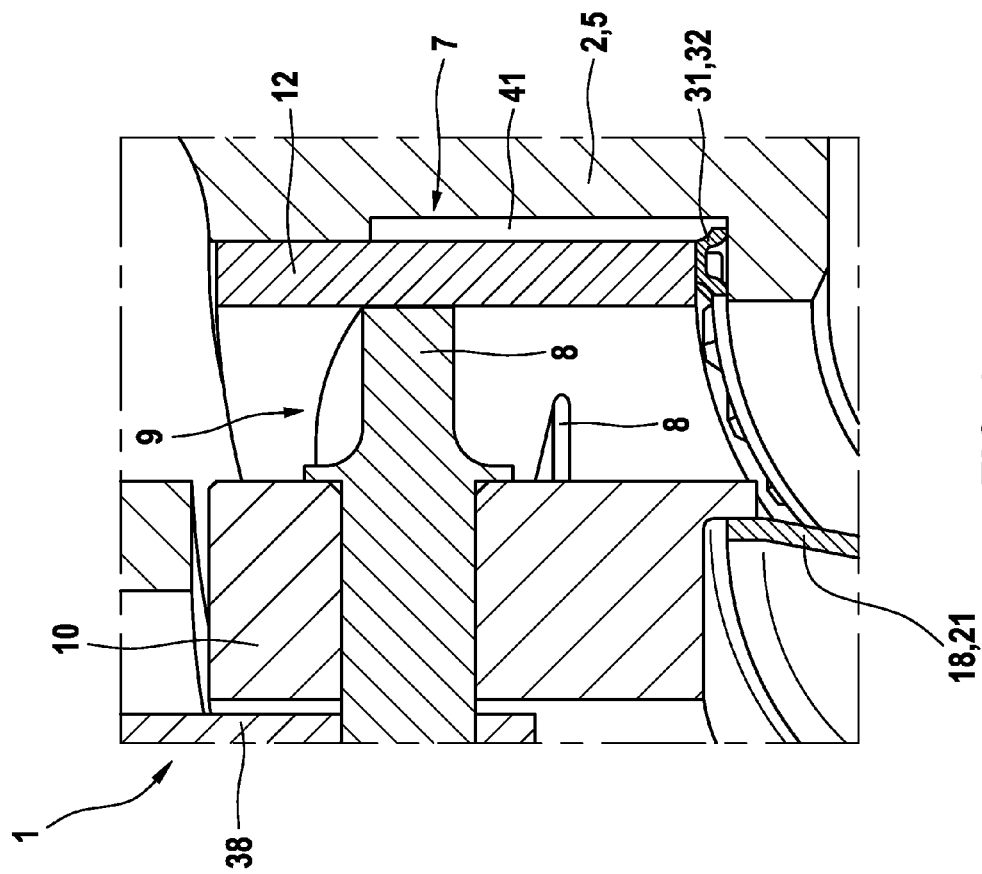
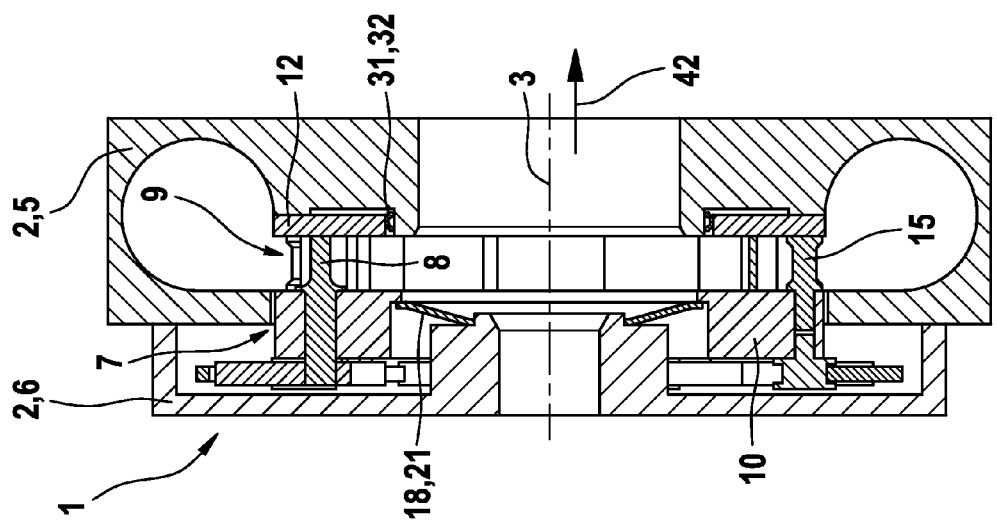

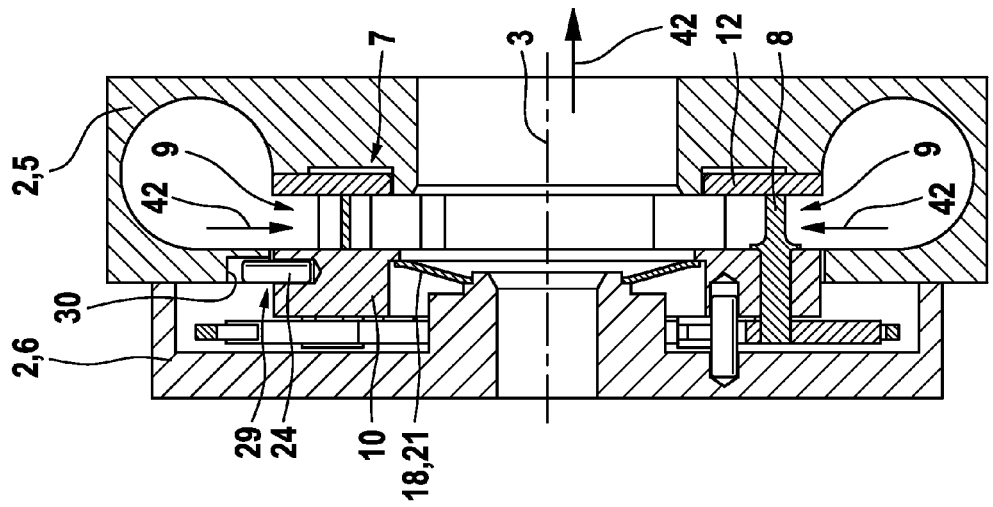
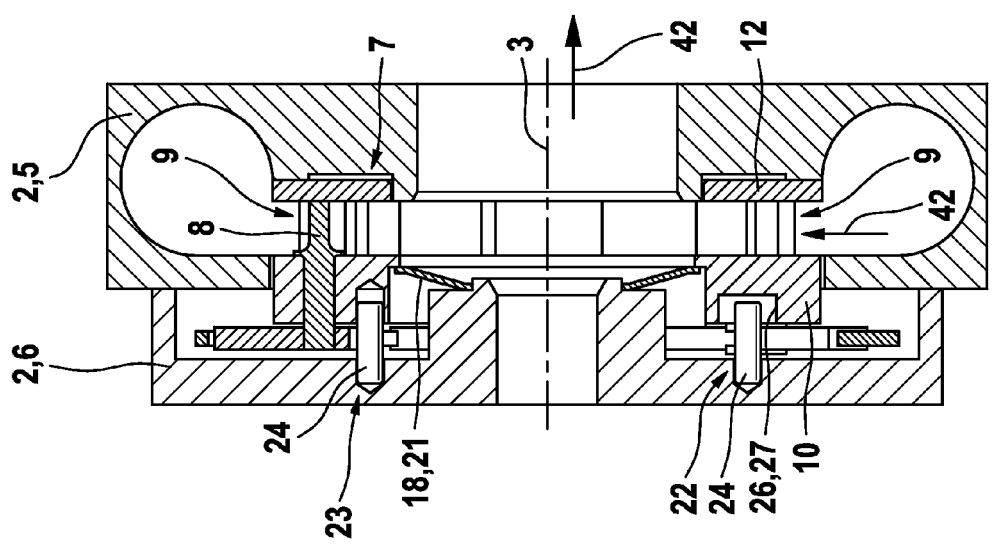
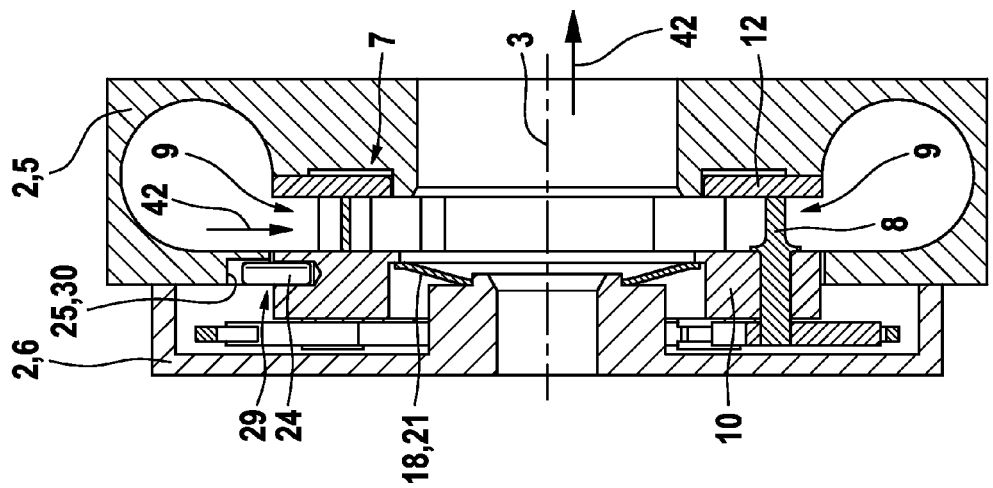

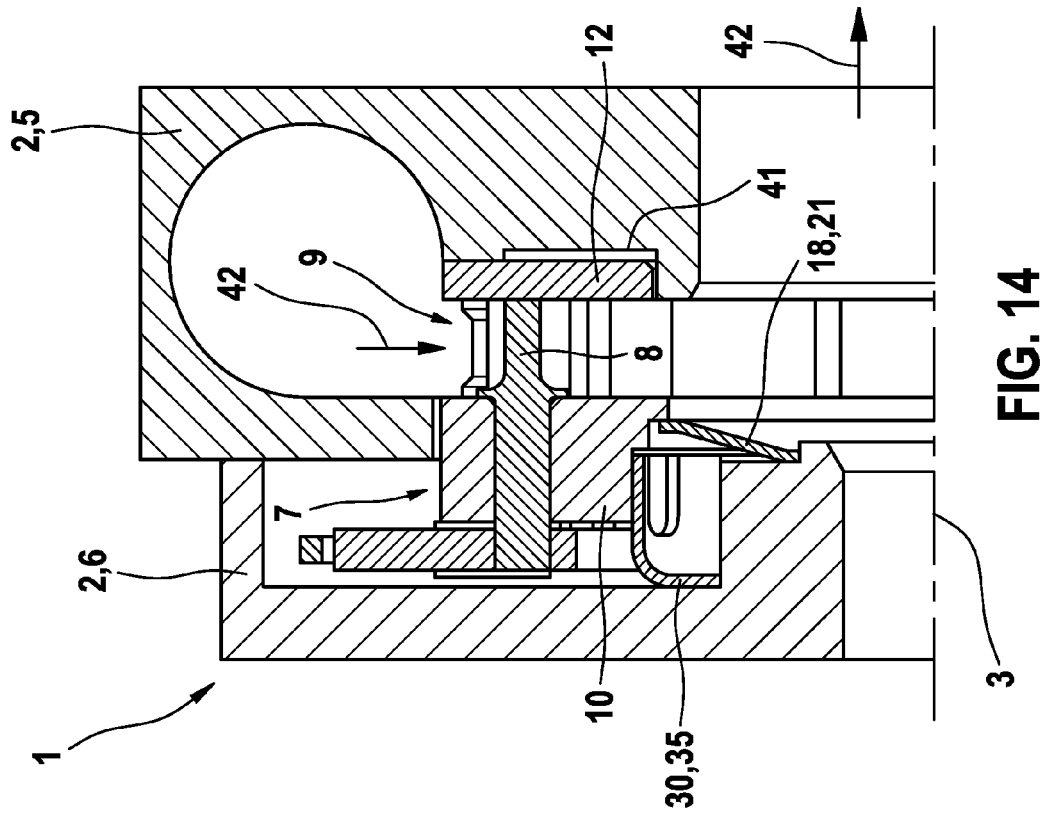
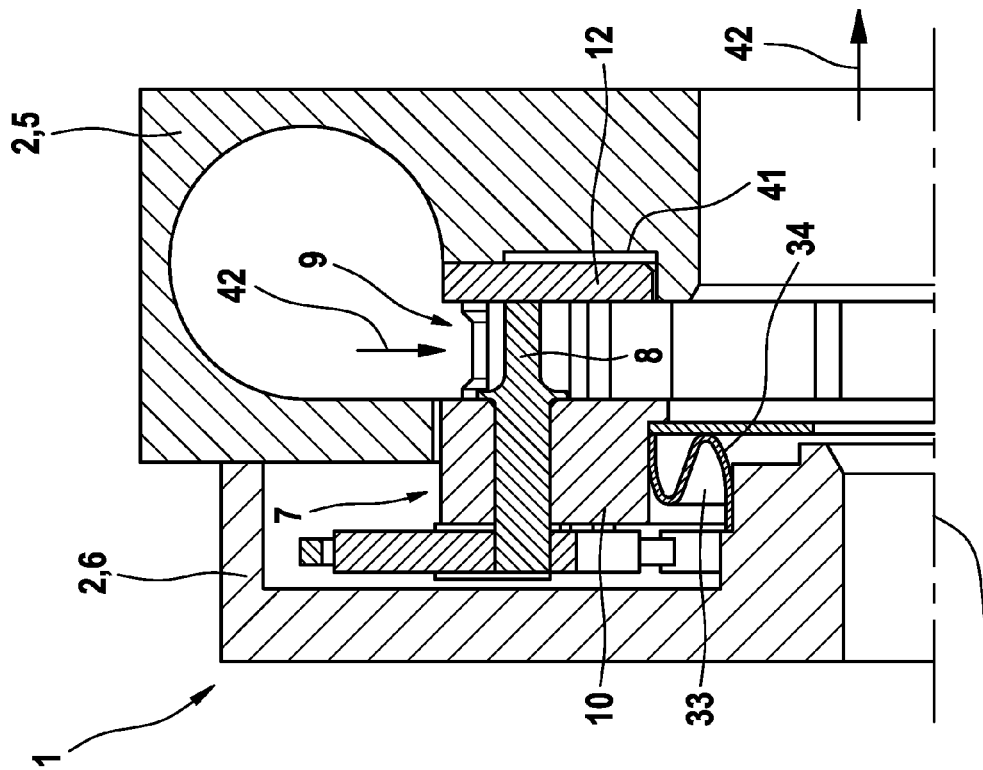

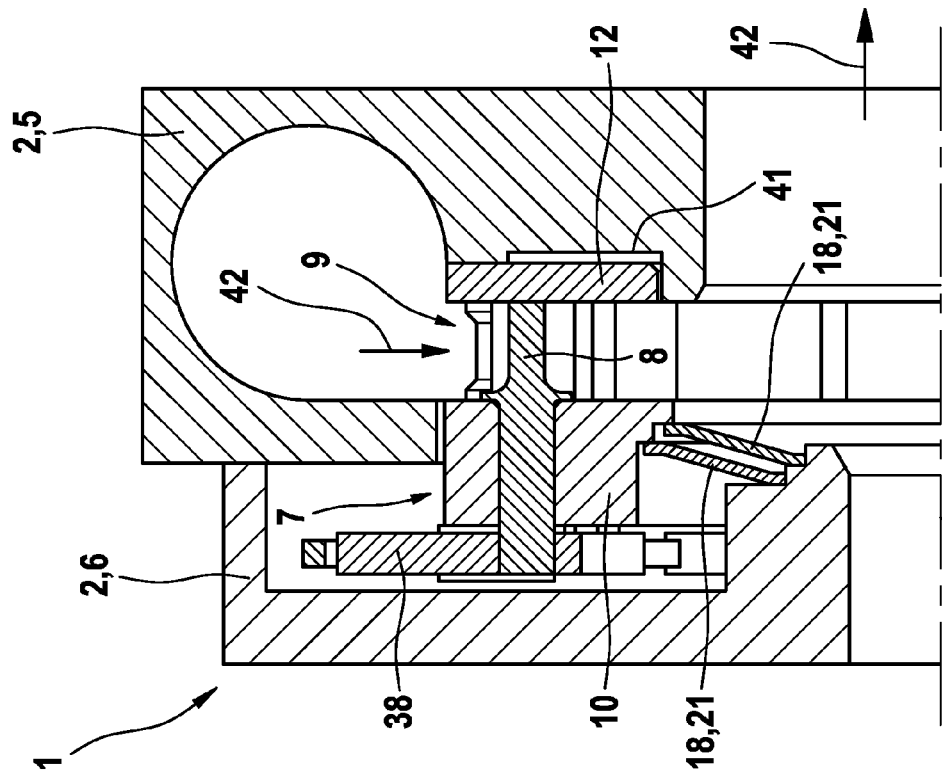
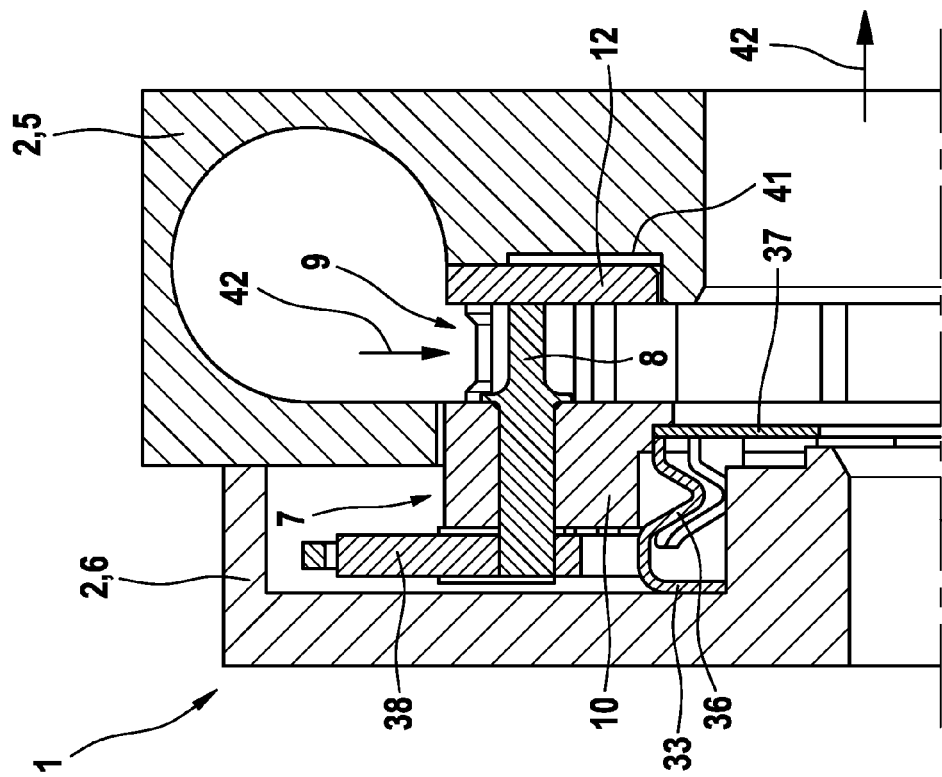

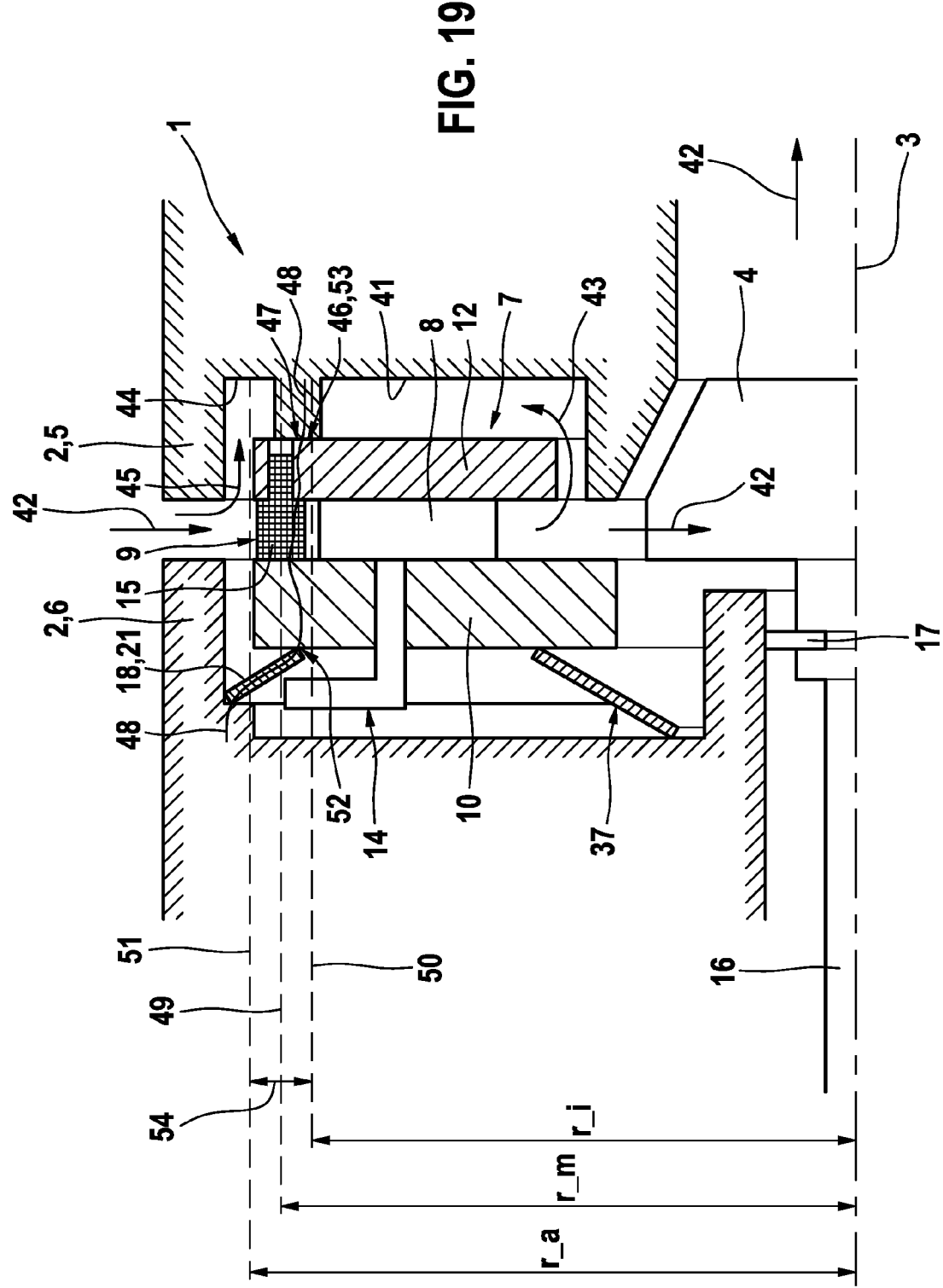

TURBINE, PARTICULARLY FOR AN EXHAUST GAS TURBOCHARGER, AND EXHAUST GAS TURBOCHARGER

CROSS-REFERENCES TO RELATED APPLICATIONS

This application is a continuation application of U.S. patent application Ser. No. 12/863,602, filed on Jul. 20, 2010 (issuing as U.S. Pat. No. 8,684,678 on Apr. 1, 2014), which claims priority to German patent applications DE 10 2008 005 406.2 filed on Jan. 21, 2008, DE 10 2008 000 776.5 filed on Mar. 20, 2008, and PCT/EP2009/05053 filed on Jun. 27, 2009. All of these applications are hereby incorporated by reference in their entirety.

TECHNICAL FIELD

The invention relates to a turbine, in particular for an exhaust gas turbocharger with a turbine rotor rotatably mounted in a housing, which is associated with at least one guide apparatus forming a radial inlet channel for a medium driving the turbine rotor.

Furthermore, the invention relates to an exhaust gas turbocharger, in particular for a motor vehicle having a turbine and a compressor which are operationally connected with each other mechanically.

BACKGROUND

Turbines, in particular in motor vehicle construction, are known from the prior art in connection with gas turbochargers having a turbine rotor rotatably mounted in a housing, which is associated with a least one guide apparatus forming a radial inlet channel for a medium driving the turbine rotor. In motor vehicle construction turbochargers are used to increase the power and the rotational moment of a combustion engine. The turbine more specifically the turbine rotor of the turbine of such an exhaust gas turbocharger is driven by an exhaust gas flow of the combustion engine and in turn drives a compressor which in turn compresses and drives drawn-in fresh air into the cylinders of the combustion engine. By compressing the fresh air the fresh air component introduced in the cylinders of the combustion engine is increased and the power and rotational moment increase achieved as a result. Since the turbine is driven by the exhaust gas of the combustion engine no additional units for increasing the charging volume of the cylinders are necessary. In the meantime, turbines are also used which have a so-called variable turbine geometry (VTG). Turbines with variable turbine geometry are based on the mode of operation of the Francis turbine and serve to better or optimally adjust/adapt the power output and the response characteristics of the turbine or the exhaust gas turbocharger to different points of operation. To achieve this, a turbine with variable turbine geometry comprises a guide apparatus assigned to the turbine rotor and which forms a radial inlet channel for the medium (in this case the exhaust gas of the combustion engine) driving the turbine rotor. In the inlet channel formed by the guide apparatus adjustable guide vanes are arranged which radially surround the turbine rotor. These guide vanes can be adjusted with respect to their vane angle to change the flow cross section of the inlet channel. Usually, the guide vanes are distributed evenly or at equal angles over the circumference of the turbine rotor and, spaced from this, on a guide vane bearing ring of the guide apparatus. The vane angle of the guide vanes for example is set in such a manner that with a low throughput of the medium driving the turbine rotor and with simultaneously high power requirement the flow cross section in the inlet channel is reduced so that the medium is directed onto the turbine vanes in an accelerated manner, as a result of which the rotational speed of the turbine and thus the power of the compressor or the exhaust gas turbocharger is increased. Conversely, with a high throughput of the medium and a low power requirement, the flow velocity of the medium can be reduced through a large flow cross section, as a result of which the power of the turbine and thus that of the exhaust gas turbocharger is reduced.

From the European Patent Publication EP 0160460 B1 a turbine as described above is known, wherein the vane bearing ring is mounted axially displaceably and, together with a housing section of the housing of the turbine, axially delimits the inlet channel.

SUMMARY

The invention provides for a turbine with a turbine rotor rotatably mounted in a housing, which is associated with at least one guide apparatus forming a radial inlet channel for a medium driving the turbine rotor, wherein the guide apparatus comprises a guide vane bearing ring as well as a guide vane cover ring having a plurality of guide vanes radially surrounding the turbine rotor and located in the inlet channel, and wherein the inlet channel is axially delimited by the guide vane bearing ring and the guide vane cover ring and the guide apparatus is mounted in the housing in an axially and/or radially moveable manner for material relaxation. The turbine according to the invention thus comprises a guide apparatus which, in addition to the guide vane bearing ring comprises a guide vane cover ring, which together with the guide vane bearing ring axially delimits the inlet channel for the medium driving the turbine rotor. The guide vane bearing ring and the guide vane cover ring, as the name implies, are each designed as a ring. Throughout the present application, guide vane bearing ring and guide vane cover ring each therefore does not mean a bush or a bush-like element but a ring, comprising a simple cross section preferably substantially rectangular in shape, whose radial extension is substantially equal or preferentially greater than its axial extension. Here, the guide vane cover ring is arranged parallel to the guide vane bearing ring, wherein the distance between the guide vane bearing ring and the guide vane cover ring substantially corresponds to the width or the axial extension of the guide vanes.

The guide vane cover ring has the advantage that stresses and/or deformations of the housing of the turbine, which for example develop based on mechanical overloading and/or based on temperature-related stresses and/or deformations, do not impair the efficiency of the guide apparatus. The design of the guide apparatus by means of rings guide vane bearing ring and guide vane cover ring allows particularly simple and cost-effective manufacture of the turbine.

In the mentioned prior art the guide vanes directly contact the housing of the turbine. Any deformation of the housing for the above mentioned reasons in this case will result in high friction values between the guide vanes and the housing in the event of an adjustment or a change of the vane angle of the guide vanes. It this stresses and deformations of the housings are sufficiently high, the guide vanes can no longer be adjusted or actuated. The variable turbine geometry is thus no longer functional. The guide vane cover ring thus substantially decouples the housing of the turbine, so that the guide vane cover ring acts like a buffer for the stresses and deformations that occur in the housing. In addition to this, the guide vane cover ring is advantageously manufactured of a high-quality material. The guide vanes which in operation contact the guide vane cover ring and move if required, easily lead to rapid corrosion, erosion and/or rapid wear of the contact points on the guide vane cover ring. These corrosion points can be so pronounced that the guide vanes "seize" on the guide vane cover ring. This also prevents adjusting of the flow cross section of the inlet channel by means of the guide vanes. The advantageous guide vane cover ring which, as already mentioned, is manufactured of the high-quality material, prevents such corrosion because of its material properties. Obviously it will also be conceivable to manufacture the entire turbine housing of the high-quality material, but this would result in extremely high costs and high manufacturing expenditure, which can be avoided through the use of the advantageously designed guide vane cover ring. According to the invention, the entire guide apparatus consisting of the guide vane bearing ring, the guide vanes and the guide vane cover ring is now mounted axially and/or radially moveable in the housing for material relaxation. The guide apparatus is not fixed to the housing for example by means of a screw connection. The guide apparatus mounted axially and/or radially moveable allows relative movement between itself and the housing, as a result of which stresses both in the guide apparatus as well as in the housing are reduced and because of this the lifespan of the guide apparatus or the turbine is increased. This allows temperature-related expansion/extension of the individual components of the guide apparatus without stresses developing in the guide apparatus, particularly when hot exhaust gasses of a combustion engine are admitted to the turbine. In radial and/or axial extension of the guide apparatus play is practically provided to the housing which is of such a size that the material of the guide apparatus and/or of the housing can expand even under high (temperature) loading without "jamming" the guide apparatus in the housing. The mounting of the guide apparatus thus allows relaxation of the material through axial and/or radial (compensatory) movement.

According to a further development of the invention the guide apparatus is mounted axially moveable without preload. The guide apparatus now lies in the housing in a "loose" or "floating" manner so that it can freely move for material relaxation.

However, the guide apparatus is preferably subjected to an axial preload and/or radial clamping which fix the guide apparatus axially and/or radially in the housing in such a manner that the guide apparatus is pressed against the housing and wobbling for example due to shocks or vibrations is thus prevented. Practically, the preload is selected such that it is significantly smaller than the stresses that occur in the guide apparatus, in particular due to temperature. The guide apparatus is thus mounted in the housing in a floating manner (without preload) or with at least a (small) preload.

Advantageously the guide vane bearing ring and the guide vane cover ring each lie in an axial depression of the housing. The axial depression in this case can for example be milled, turned or bored into the housing in a simple manner. Practically, the contour of the axial depression substantially corresponds to that of the guide vane bearing ring or that of the guide vane cover ring, so that these have the necessary play for material relaxation at their disposal.

According to a further development of the invention the housing is designed in multiple parts. This makes possible particularly simple and cost-effective assembly of the guide apparatus in the housing or in the axial depressions of the housing. Practically, the guide apparatus is initially placed axially in the axial depression of a housing part and the other housing part subsequently pushed onto the (axial) free end of the guide apparatus.

Advantageously, the first housing part is a turbine housing. The turbine housing substantially surrounds the turbine rotor of the turbine and practically comprises a radial, more preferably ring-spiral shaped inlet channel which directs the medium towards the inlet channel of the guide apparatus and a central or axial outlet channel, which extends in the axial extension of the turbine rotor.

Practically, the second housing part is a bearing housing. In the bearing housing a shaft, on which the turbine rotor is mounted in a rotationally fixed manner, is rotatably mounted. Particularly preferably, the shaft is mounted in the bearing housing by means of one or a plurality of rolling bearings such as for example grooved ball bearings, tapered roller bearings etc. Slide bearing mounting of the shaft is also conceivable. The bearing housing axially follows the turbine housing.

Furthermore it is provided that the axial depression for the guide vane bearing ring is formed in the bearing housing and the axial depression for the guide vane cover ring in the turbine housing. In principle, reverse arrangement is also possible, wherein the guide vane bearing ring lies in the axial depression in the turbine housing and the guide vane cover ring in the axial depression of the bearing housing. Preferred, however, is the first version, since in this case the necessary mechanism for the displacement of the guide vanes for package reasons (space) can be more easily arranged in the bearing housing than in the turbine housing, which has to be designed particularly flow-favourable for the medium driving the turbine rotor.

An advantageous further development of the invention provides that the turbine comprises at least one axial spring element for generating the axial preload. As already mentioned above, the spring load, compared to the temperature-related stresses of the guide apparatus, is selected small. Here, it can be provided that merely an axial spring element is used, which presses the guide apparatus against one of the axial depressions, or two or more axial spring elements can be provided which are each arranged for example at an axial end of the guide apparatus.

Preferably, the axial spring element is arranged between the guide vane bearing ring and the housing, or the bearing housing, and/or between the guide vane cover ring and the housing, or the turbine housing. If the axial spring element is arranged between the guide vane bearing ring and the bearing housing, this has the advantage that the axial spring element is not severely heated since the bearing housing is relatively cool. The reason for this is that it does not come in contact with the hot exhaust gas or only to an extremely minor degree. Through the arrangement of the axial spring element of the bearing housing the lifespan of the spring is thus increased or guaranteed. If the axial spring element however is arranged (axially) between the guide vane cover ring and the turbine housing it is located on the hot side of the turbine. Because of this, the guide apparatus is pressed in the direction of the cold side, that is against the bearing housing. Through the direct contact of the guide vane bearing ring with the bearing housing the guide apparatus is "cooled" by the bearing housing.

Advantageously, the axial spring element is designed as helical spring, coil spring or disc spring. Wherein, in addition to the mentioned axial spring element types, the use of an O-ring, taper ring, barrel spring ring, B-ring, C-ring, a metal sealing ring or a sponge-like fabric is conceivable for example. The material of the axial spring element can be of a wide range of types such as for example metal or a composite material or ceramic. Particularly preferred, the disc spring is simultaneously designed as heat shield and/or as seal.

Furthermore, it is provide that the turbine comprises at least one radial spring element for radiating the radial preload. This is preferably arranged between the housing and the outer and/or inner circumference of the guide vane cover ring. Like the axial spring element the radial spring element has a spring force which relative to the stresses developing in the guide apparatus, is small, so that the guide apparatus can radially expand freely so that its material remains low-stressed or "relaxed".

Particularly preferably, the radial spring element is designed as a wavy ring. The wavy ring, also called bearing compensation ring, in this case extends over the entire inner or outer circumference of the guide vane cover ring or the guide vane bearing ring. Obviously an open guide vane cover ring or guide vane bearing ring is also conceivable.

In an advantageous further development of the invention the turbine comprises at least one radial-axial spring element for generating the axial and the radial preload. Instead of an axial spring element and a radial spring element it is thus provided to use a single radial-axial spring element which simultaneously generates the axial and radial preload, applying it to the guide apparatus. The radial-axial spring element can for example be formed of a pleated ring with radial pleats which contacts the housing and the guide apparatus both axially as well as radially.

Furthermore, it is provided in an advantageous further development of the invention that the guide vane bearing ring and the guide vane cover ring are axially and/or radially displaceable relative to each other for material relaxation. Here, not only the entire guide apparatus is moveably mounted in the housing, but the individual components/parts of the guide apparatus are also moveably mounted relative to one another. Wherein in the case of preload-free mounting of the guide apparatus the guide vane bearing ring and the guide vane cover ring are also loose, that is moveable, relative to each other without preload. If the guide apparatus is subjected to axial preload this obviously also has an effect on the components of the guide apparatus so that the guide vane bearing ring is axially pressed against the guide vane bearing ring (or vice versa). The free moveability or the loose arrangement of the guide apparatus and that of the guide vane bearing ring to the guide vane cover ring results in that the play of the guide vanes between the guide vanes and the guide vane cover ring can be designed particularly small, as a result of which the (thermodynamic) efficiency of the turbine is improved. The turbine thus designed with "floating" variable turbine geometry makes possible minimal deformations and stresses. Through the free moveability of the guide vane bearing ring and the guide vane cover ring the friction between the guide vanes and the guide vane cover ring is reduced so that in this case corrosion formation, erosion and/or wear are also prevented.

Advantageously, at least one, preferably a plurality of axial spacers is provided between the guide vane bearing ring and the guide vane cover ring. These axial spacers secure a minimum spacing of the guide vane bearing ring from the guide vane cover ring which is defined by the axial extension of the axial spacer. The size of the axial spacer is practically selected in such a manner that between the guide vanes and the guide vane cover ring and the guide vane bearing ring preferably small play is present and a preferably low friction is in effect when adjusting the guide vanes.

Advantageously, the axial spacers are arranged or fixed on the guide vane bearing ring and/or the guide vane cover ring. Thus all of the axial spacers can be arranged on the guide vane cover ring or on the guide vane bearing ring or for example alternately on the guide vane cover ring and the guide vane bearing ring. In addition to this is conceivable that the axial spacers are designed in two parts, wherein one part is arranged on the guide vane bearing ring and the other part opposite on the guide vane cover ring. Because of the geometry of the components and the different temperature loading the guide vane cover ring is not deformed as much as the guide vane bearing ring. For this reason, the axial spacers are preferably arranged or fixed on the guide vane cover ring. Inclined positioning of the guide vane cover ring due to temperature-related stresses is only minor so that the axial spacers change their contact with the guide vane bearing ring only to a minor degree and thus the axial extension or the width of the inlet channel and thus also the play between the guide vanes and the guide vane cover ring and the guide vane bearing ring is changed/influenced only to a minor degree.

Particularly preferably, the axial spacers are unitarily formed with a guide vane bearing ring or the guide vane cover ring. Practically, the axial spacers are arranged evenly or equiangularly or unevenly or non-equiangularly on the end face of the guide vane bearing ring and/or the guide vane cover ring facing the inlet channel. If the axial spacers are designed in two parts the two parts are each preferably designed unitarily with the guide vane bearing ring or the guide vane cover ring.

Furthermore, it is provided that the turbine comprises at least one pin connection for positioning and/or aligning the guide apparatus, the guide vane bearing ring and/or the guide vane cover ring on the housing. Preferably the pin connection comprises at least one pin which is inserted in a pin reception of the guide apparatus or one of its components and/or the housing. By using one or a plurality of pin connections the assembly of the turbine remains simple and cost-effective.

Practically, at least one pin reception is designed as elongated hole so that relocating or moving of the guide apparatus, the guide vane bearing ring or the guide vane cover ring relative to the pin inserted in the pin reception is possible.

Preferably, the elongated hole is orientated radially or axially in its longitudinal extension. If the elongated hole is orientated radially, radial movement of the pin engaging in the elongated hole or an extension of the component comprising the pin is possible without generating stress. If the elongated hole in its longitudinal extension is orientated axially, that is parallel to the rotational axis of the turbine rotor, corresponding expansion of the material due to rising temperatures is possible in axial direction without stresses being generated.

Advantageously, the pin is orientated axially and/or radially. In both cases it acts as positioning device or anti-rotation safety. If it is orientated axially, it allows axial movement of the guide apparatus or its components for material relaxation. If it is orientated radially it correspondingly allows radial movement/expansion for material relaxation. Obviously in both cases it is presumed that the pin in its longitudinal extension is moveably mounted with adequate play.

Furthermore, it is provided that at least one pin of a pin connection is formed by one of the axial spacers. Here it is provided that the axial spacer protrudes through the guide vane bearing ring or the guide vane cover ring and stands away on the face end located opposite the inlet channel from the corresponding ring and engages in a pin reception of the housing. Alternatively to this, the pin is likewise designed unitarily with the respective ring or the housing.

Particularly preferably, the turbine is additionally designed in such a manner that the line of flux of the axial preload through the guide apparatus substantially runs parallel to the rotational axis of the turbine rotor. It is thus provided that the line of flux of the axial preload substantially runs axially or axially through the guide apparatus. In the case of large spring forces and under unfavourable transient conditions during which for example the axial spring element on the one hand is still cold and brings about a great axial force or preload and on the other hand the guide vane cover ring is already heated and can no longer tolerate high stresses, the guide vane bearing ring and/or the guide vane cover ring can be deformed particularly dish-like through the force of the axial spring element if the line of flux through the guide vane bearing ring and/or through the guide vane cover ring substantially runs radially or in radial direction. Through the substantially axial course of the line of flux the occurrence of moments in the guide apparatus resulting in deformations is prevented. As a consequence, greater axial spring forces can be tolerated, deformations particularly under transient conditions are smaller so that the play of the guide vanes can be selected smaller, as a result of which the efficiency of the turbine is improved and the lifespan increased. More favourable materials can also be used.

Practically, at least one axial spring contact region of the guide apparatus is substantially located on the same radius as the axial spacer or, for example if a plurality of axial spacers and/or axial spring elements or axial spring contact regions are provided, as the axial spacers. This guarantees a substantially axial line of flux of the axial preload from the axial spring element through the guide apparatus via the axial spacers. The axial spring contact region in this case is obviously arranged on the side of the guide vane bearing ring or the guide vane cover ring facing away from the axial spacer, depending on which side the of the guide apparatus the axial spring element or elements is/are provided/arranged.

Advantageously, the axial spring contact region is arranged aligned with the axial spacer. If a plurality of axial spring elements and a plurality of spacers are provided, the corresponding axial contact regions are each arranged or orientated aligned with an axial spacer. The axial spring contact region or the axial spring contact regions are thus arranged in the imagined extension of the axial spacer or spacers. Because of this, it is prevented that moments occur in circumferential direction which can likewise result in deformation of the guide vane cover ring and/or the guide van bearing ring. If, therefore, the axial force introduction point from the axial spring element and the force transmission point to the axial spacer are approximately at the same height, no undesirable stresses and deformations occur.

Advantageously, at least one axial contact region of the housing is substantially located on the same radius as the axial spacer and/or as the axial contact region of the guide apparatus. The guide apparatus of the contact region in this case obviously means the region of the housing which the guide apparatus with the guide vane cover ring or, if applicable, with the guide vane bearing ring contacts axially. Thus the axial guide apparatus contact region is formed for example through one of the axial depressions described above in which the guide apparatus lies. Wherein, if the guide apparatus with the guide vane cover ring contacts the axial contact region with the entire area of the guide vane cover ring, the line of flux through the guide apparatus already runs substantially axially because of the arrangement of the axial spacer/the axial spacers and of the axial spring contact region/the spring contact regions. If, however, in the housing advantageously one or a plurality of clearances or recesses open at the edge towards the guide vane cover ring are provided through which the medium driving the turbine rotor can flow for heating the guide vane cover ring on both sides, the guide vane cover ring only partially contacts the housing, wherein the axial contact region of the housing, as described above, is then practically arranged substantially on the same radius as the axial spacer or axial spacers. If a plurality of clearances or recesses are arranged distributed equiangularly over the circumference of the guide vane cover ring or the axial contact region of the housing, the axial (part) contact regions located in between are preferably arranged aligned with the spacers so that in this case moments in circumferential direction resulting in deformations are also prevented. Obviously, the axial contact region and/or the axial spring contact region can each be also designed as contact point or line.

Finally, it is provided that the line of flux of the axial preload does not deviate by more than 20% from the radius on which the spacer or spacers are located. Because of this a line of flux flow range is defined, within which the line of flux substantially runs axially or is axial. Through corresponding arrangement of the axial spring element or the axial spring contact region, of the axial spacer/or the axial contact region of the housing, as described above, this preferred line of flux flow range can be achieved.

BRIEF DESCRIPTION OF THE DRAWINGS

The exhaust gas turbocharger according to the invention is characterised by a turbine as has been described above.

In the following the invention is explained in more detail by means of several drawings. Here it shows FIG. 1 An exemplary embodiment of a turbine with a guide apparatus that is axially and radially moveable without preload, FIG. 2 A turbine with an axial spring element between the guide apparatus and a turbine housing, FIG. 3 The turbine with the axial spring element between the guide apparatus and a bearing housing, FIG. 4 A further exemplary embodiment of the turbine with pin connections, FIG. 5 A further exemplary embodiment of the turbine with axial spacers, FIG. 6 The turbine from FIG. 5 with a pin connection, FIG. 7 A further exemplary embodiment of the turbine with a radial spring element, FIG. 8 An enlarged detail of the turbine from FIG. 7, FIG. 9 The turbine of FIG. 7 with an alternative radial spring element, FIG. 10 A further exemplary embodiment of the turbine with a pin connections, FIG. 11 A further exemplary embodiment of the turbine with pin connections, FIG. 12 A further exemplary embodiment of the turbine with pin connections, FIG. 13 An exemplary embodiment of the turbine with a radial-axial spring element, FIG. 14 A further exemplary embodiment of the turbine with an axial spring element and a radial spring element, FIG. 15 The turbine with an alternative radial-axial spring element, FIG. 16 A further exemplary embodiment of the turbine with two axial spring elements on a side of the guide apparatus, FIG. 17 A further exemplary embodiment of the turbine with a coil spring as axial spring element, FIG. 18 A further exemplary embodiment of the turbine with recesses and, FIG. 19 A preferred line of flux flow through the guide apparatus.

DETAILED DESCRIPTION

Figure 1:
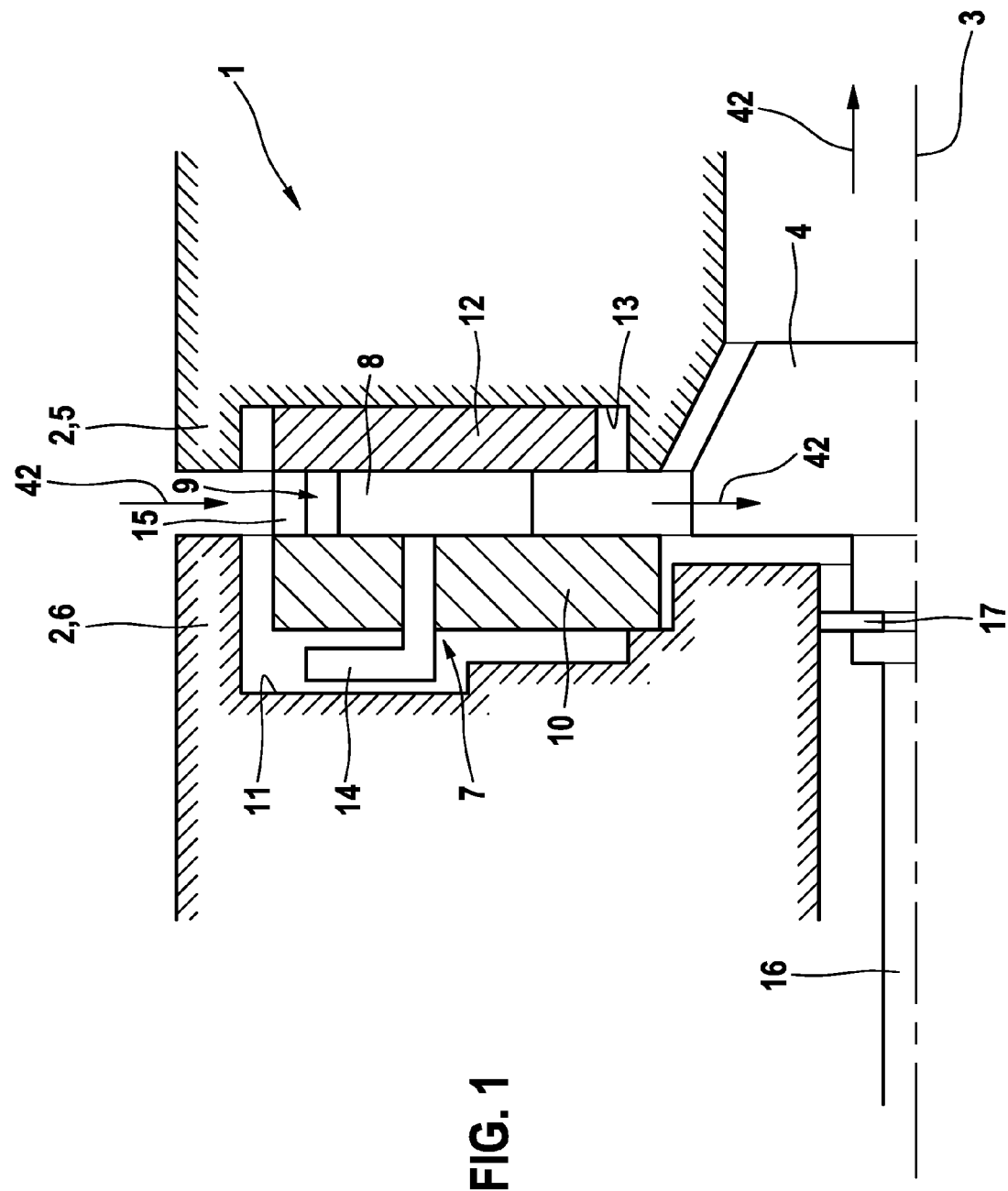

FIG. 1 shows a turbine 1 of an exhaust gas turbo-charger for a motor vehicle which is not shown in more detail here in a schematic sectional representation. The turbine 1 comprises a turbine rotor 4 rotatably mounted about a rotational axis 3 in a housing 2, wherein only the part above the rotational axis 3 is shown. The housing 2 of the turbine 1 is designed in two parts, wherein one part forms a turbine housing 5 and the other part a bearing housing 6, wherein the bearing housing 6 with respect to the rotational axis 3 axially follows the turbine housing 5, and between the turbine housing 5 and the bearing housing 6 a flow cross section for a medium driving the turbine rotor is formed. The medium, in the present exemplary embodiment the exhaust gas of the combustion engine, can radially flow into the housing 2 to the turbine rotor 4 and once it has performed work on the turbine rotor 4, again axially exists from the turbine housing 5 as indicated by the arrows 42.

In the housing 2 of the turbine 1 a guide apparatus 7, which has a variable turbine geometry and forms a radial inlet channel 9 for the medium in the flow-through cross section between the turbine housing 5 and the bearing housing 6, is additionally mounted. The guide apparatus 7 comprises a guide vane bearing ring 10, which coaxially to the rotational axis 3 lies in an axial depression 11 of the bearing housing 6. On the guide vane bearing ring 10 a plurality of guide vanes 8 of which only one is shown here are equiangularly arranged distributed over the guide vane bearing ring 10, so that they surround or frame the turbine rotor 4. The guide apparatus 7 additionally comprises a guide vane cover ring 12 which is orientated coaxially to the rotational axis 3 and lies in an axial depression 13 of the turbine housing 5. The guide vane bearing ring 10 and the guide vane cover ring 12 thereby axially delimit the inlet channel 9 for the medium driving the turbine rotor 4. The axial spacing of the guide vane bearing ring 10 from the guide vane cover ring herein corresponds substantially to the width of the guide vanes 8. By adjusting the vane angle of the guide vanes the flow-through cross section in the inlet channel can thus be adjusted or influenced in operation. By means of this, the power of the turbine 1 can for example be adapted to different operating conditions/operating points. For adjusting, the guide vanes 8 each have a lever arm 14. Advantageously, for actuating or adjusting the vane angle of the guide vanes 8, an adjusting ring which is not shown in more detail here is provided, which is arranged on the side of the guide vane bearing ring 10 located opposite the inlet channel 9 and operationally connected with the lever arms 14 so that by twisting the adjusting ring all guide vanes 8 can be simultaneously adjusted with respect to their vane angle.

In the exemplary embodiment of FIG. 1 the guide apparatus 7 is mounted axially and radially moveably without preload for material relaxation. To this end, axial play is provided between the guide vane bearing ring 10 and the bearing housing 6 and/or between the guide vane cover ring 12 and the turbine housing 5, which allows expansion of the components of the guide apparatus 7 because of the high temperature of the exhaust gas without the guide apparatus 7 or it components (guide vane bearing, guide vanes, guide vane cover ring) having to be clamped in the housing 2 in such a manner that stresses develop in the components and/or the individual components are deformed. In operation, the guide apparatus 7 can thus expand axially for example as a result of which material stress is reduced/prevented or material relaxation is guaranteed. Material relaxation here substantially means the prevention of the occurrence of stresses in the material of the components of the guide apparatus 7 such as for example the material of the guide van bearing ring pin or of the guide vane cover ring 12. The radial moveability of the guide apparatus 7 or its components or parts is guaranteed through a suitably wide formation of the axial depressions 11 and 13, so that the guide vane bearing ring 10 in the bearing housing 6 is arranged radially spaced from the bearing housing 6 and the guide vane cover ring 12 is arranged radially spaced from the turbine housing 5. Thus the guide apparatus 7 or its components can radially grow unimpeded, so that no stresses are generated. In the present exemplary embodiment the components of the guide apparatus 7 loosely contact the housing 2 or one another. In other words, the guide apparatus 7 is mounted in the housing 2 of the turbine 1 in a floating manner. This mounting of the guide apparatus 7 allows relative movement between the guide apparatus 7 and the housing 2 or among the components the guide apparatus 7, as a result of which stresses in the components are reduced and the lifespan of the turbine 1 is increased. This makes it possible that a particularly small play can be selected between the guide vanes 8 and the guide vane cover ring 12. In that the guide apparatus 7 or its components are mounted axially moveably it is prevented that the guide vanes 8 also ') am" between the guide van bearing ring 10 and the guide vane cover ring 12 under high temperature loading. The friction between the guide vanes 8 and the guide vane cover ring 12 is likewise reduced when adjusting the vane angle of the guide vanes 8. Because of this it is additionally prevented that rapid corrosion/rapid wear of the guide vane cover ring 12 or the guide vanes 8 takes place. Because of the floating mounting or because of the absence of screws and/or threaded bores this concept is particularly favourable in production and can be easily assembled. The guide apparatus 7 in this case can be provided and installed in the turbine 1 as a preassembled assembly. Alternatively the components of the guide apparatus 7 can be inserted individually.

In order to secure a minimum axial spacing between the guide vane bearing ring 10 and the guide vane cover ring 12, axial spacers 15 are provided between the guide vane bearing 10 and the guide vane cover ring 12. These are advantageously arranged equiangularly, while obviously uneven distribution is also conceivable. The axial spacers 15 can be optionally arranged or fixed on the guide vane bearing ring 10, on the guide vane cover ring 12 or alternately on the guide vane bearing ring 10 and the guide vane cover ring 12. Particularly preferably the axial spacers 15 are designed unitarily with the guide vane bearing ring 10 or the guide vane cover ring 12.

The turbine rotor 4 is arranged on a shaft 16 which leads into the bearing housing 6 where it is suitably mounted rotatably for example by means of rolling bearings and/or slide bearings. On the end of the shaft 16 located opposite the turbine rotor 4 a compressor rotor of a compressor of the exhaust gas turbocharger is suitably arranged on the shaft 16 in a rotationally fixed manner. To prevent that hot exhaust gas flows into the bearing housing 6, a sealing element 17 is additionally arranged between the shaft 16 and the bearing housing 6.

FIG. 2 shows a further exemplary embodiment of the turbine 1 known from FIG. 1, wherein elements known from FIG. 1 are provided with the same reference characters and are not explained again. This applies also to the following FIGS. 3 to 17, in which already known elements are provided with already used reference characters. FIG. 2 shows the turbine 1 in a further simplified representation, wherein the guide apparatus 7 in a simplified manner is merely shown as a box 107. In contrast with the preceding exemplary embodiment the guide apparatus in FIG. 2 is subjected to axial preload. This is generated by an axial spring element 18 which is arranged between the guide apparatus 7 or the guide vane cover ring 12 which is not shown here and the turbine housing 5. The axial spring element 18 thus presses the guide apparatus 7 against the bearing housing 6. Thus the guide apparatus 7 contacts the bearing housing 6 as a result of which heat can be effectively and efficiently discharged to the bearing housing 6, so that the guide apparatus 7 is cooled by the bearing housing 6. Through the axial preload the individual components of the guide apparatus 7 are also pressed against one another. Thus the axial spring element loads the guide vane cover ring 12, which in turn presses onto the guide vanes 8 or, if present, onto the axial spacers 15 which determine the guide vane play and thus onto the guide vane bearing ring 10. The spring force of the axial spring element 18 is advantageously selected so small that temperature-related deformations of the guide apparatus 7 or its components do not result in (jamming) stresses in the components or in the guide apparatus 7. The guide apparatus 7 and particularly its components are thus mounted sufficiently moveable axially for material relaxation.

FIG. 3 shows a further exemplary embodiment of the turbine 1 which differs only slightly from the preceding exemplary embodiment from FIG. 2. The substantial difference lies in that the axial spring element 18 is arranged between the guide apparatus 7 and the bearing housing 6, wherein in the following exemplary embodiment the axial spring element 18 is designed as coil spring 19. The coil spring 19 lies in a spring reception 20 of the bearing housing 6, which for example can be formed as a bore or as a circumferential groove. The coil spring could likewise be guided or orientated and positioned by means of a spigot. Alternatively, the axial spring element 18 can also be designed as helical spring, sponge-like fabric, elastomer element or similar. The arrangement of the axial spring element 18 between the bearing housing 6 and the guide apparatus 7 has the advantage that the spring is located on the cool side of the turbine 1. Because of this, the axial spring element 18 is not heated so severely but cooled through the contact with the cool bearing housing 6.

FIG. 4 shows a further exemplary embodiment of the turbine 1 in a detailed sectional representation, wherein the turbine rotor 4 as well as the shaft 16 are not shown. The turbine 1 of FIG. 4 substantially corresponds to the turbine 1 from FIG. 3, wherein the axial spring element 18 is designed as a disc spring 21. In addition to this, the turbine 1 has two pin connections 22 and 23. The pin connection 22 consists of a pin 24 which is orientated axially—that is parallel to the rotational axis 3 and lies in a pin reception 25 in the turbine housing 5 and engages in a pin reception 26 of the guide vane cover ring 12. The pin reception 26 in the guide vane cover ring 12 in this case is designed as elongated hole 27 which is radially orientated in its longitudinal extension. The pin connection 23 likewise comprises a pin 24 which lies in a pin reception 25 of the turbine housing 5 and engages in a pin reception 26 of the guide vane cover ring 12. By designing the pin reception 26 of the pin connection 22 as elongated hole 27 the guide vane cover ring 12 can grow radially without obstruction so that no (jamming) stresses can develop in the guide vane cover ring 12 due to high temperature.

FIG. 5 shows the turbine 1 of FIG. 4 with the distinction that the pin 24 of the pin connection 23 is formed by an axial spacer 15. To this end, the axial spacer 15 is designed in such a manner that it reaches through the guide van cover ring 12 and engages in the pin reception 25 of the turbine housing 5.

FIG. 6 shows an enlarged region of the turbine 1. Here, a pin connection 29 with a pin 24 is provided between the turbine housing 5 and the guide vane cover ring 12, wherein in contrast with the preceding exemplary embodiments the pin 24 is orientated radially or perpendicularly to the rotational axis 3 or the turbine rotor 4. On the whole, the pin connections substantially serve as anti-rotation safety of the guide apparatus 7 and allow radial and axial movement of the guide apparatus 7. To this end, the pin reception 25 is formed in the turbine housing 5 with open edge as elongated hole 30 which in its longitudinal extension is orientated axially or parallel to the rotational axis 3 of the turbine rotor 4. Here it must be mentioned that with all exemplary embodiments shown in the figures there is radial and axial moveability of the guide apparatus and its components.

FIG. 7 shows a further exemplary embodiment of the turbine 1 in a sectional representation, wherein the axial spacers 15 are arranged or fixed on the guide vane bearing ring 10. To this end, the axial spacers 15 are each inserted in a corresponding opening formed in the guide vane bearing ring 10. While in the preceding exemplary embodiments of FIGS. 2 to 6 the guide apparatus 7 is loaded with an axial preload, the guide vane cover ring 12 in the present exemplary embodiment is additionally loaded with a radial preload. This is guaranteed by means of a radial spring element 31 which is designed as wavy ring 32 and clamped between the inner radius of the guide vane cover ring 12 and the turbine housing 5. The wavy ring 32 positions the guide vane cover ring 12 radially in the turbine housing 5 and thereby allows radial expansion of the guide vane cover ring 12 so that no temperature-related stresses develop in the guide vane cover ring.

FIG. 8 shows the wavy ring 32 in an enlarged representation of a detail of FIG. 7. Through the wavy shape of the wavy ring 32 the spring force of the radial spring element 31 is ensured. The wavy ring 32 additionally comprises an arched cross section.

Figure 9:
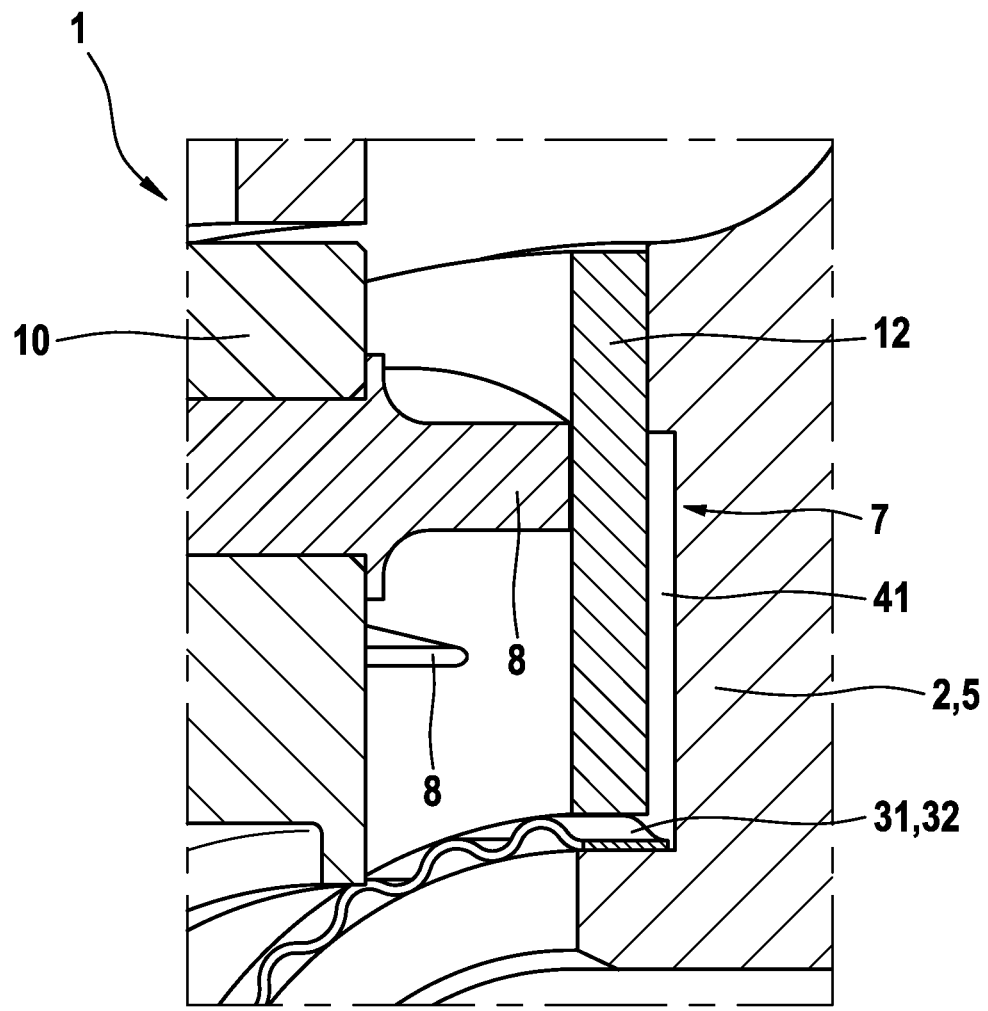

FIG. 9 shows an alternative design of the wavy ring 32, which in contrast with the preceding wavy ring 32 from FIG. 8 has a straight cross section.

FIG. 10 shows a further exemplary embodiment of the turbine 1, wherein in this case the pin connection 29 from FIG. 6 is not arranged between the turbine housing 5 and the guide vane cover ring 12, but between the turbine housing 5 and the guide vane bearing ring 10.

FIG. 11 shows an exemplary embodiment of the turbine 1 which substantially corresponds to the exemplary embodiment of FIG. 4, wherein here the pin connections 22 and 23 are provided between the bearing housing 6 and the guide vane bearing ring 10, while the radially orientated elongated hole 27 is formed in the face end of the guide vane bearing ring 10 facing away from the inlet channel. The pins 24 of the pin connections 22 and 23 in this case are orientated axially or parallel to the rotational axis 3.

FIG. 12 shows a combination of the pin connections 29 and 23, wherein the pin connection 29 is formed or provided between the turbine housing 5 and the guide vane cover ring 12 and the pin connection 23 between the bearing housing 6 and the guide vane bearing ring 10.

FIG. 13 shows an exemplary embodiments of the turbine 1 with a radial-axial spring element 33, which is arranged between the guide vane bearing ring 10 and the bearing housing 6. The radial-axial spring element 33 is designed as a pleated spring ring 34 with radial pleats, which contacts the bearing housing 6 and the guide vane bearing ring 10 both axially as well as radially. Because of this the guide apparatus 7 or the guide vane bearing ring 10 is loaded with a preload both axially as well as radially.

FIG. 14 likewise shows an exemplary embodiments for simultaneously radial and axial preloading of the guide apparatus 7, wherein for the axial preloading the already know axial spring element 18 and for the radial preloading the radial spring element 31 are provided, which in this case is designed as L-shaped ring spring element 35 which with a leg areally loads/fixes the guide vane bearing ring 10 radially.

FIG. 15 shows an alternative embodiment of the radial-axial spring element 33 from FIG. 13, which is substantially formed L-shaped and in its leg radially loading the guide vane bearing ring 10 comprises an axial spring pleat 36 which serves for generating the axial preload. A heat shield 37, which can be omitted as an option, is axially connected between the radial-axial spring element 33 and the guide vane bearing ring 10.

FIG. 16 shows a further exemplary embodiment for generating an axial preload, wherein in this case two disc springs 21 are provided which are both in contact between the bearing housing 6 and the guide vane bearing ring 10.

Figure 17:
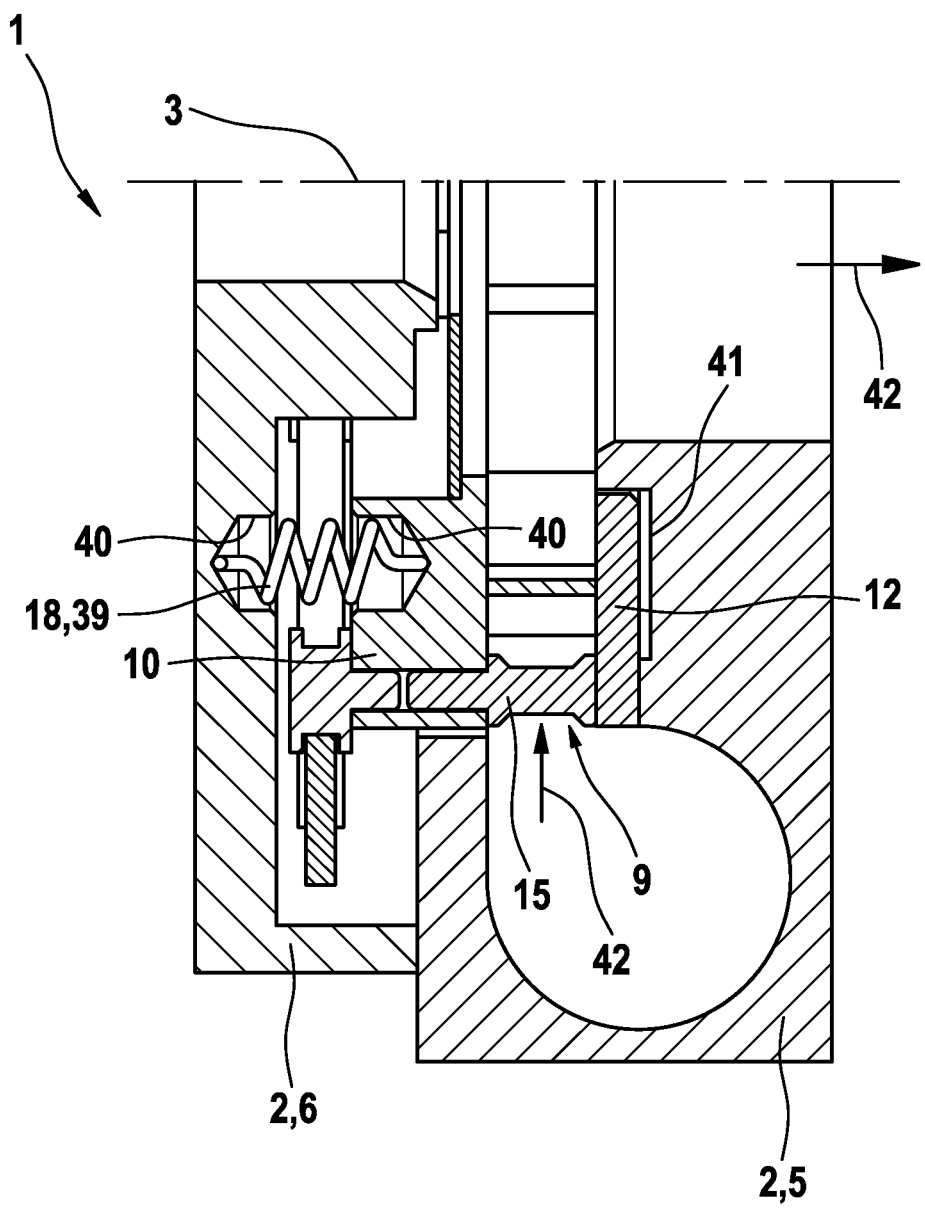

FIG. 17 shows an alternative embodiment of the axial spring element 18. Here, the axial spring element 18 is designed as a coil spring 39 which lies in axial spring receptions 40 which are formed in the bearing housing 6 and in the guide vane bearing ring 10. It is also conceivable to provide a coil spring 39 which has a conical longitudinal extension or longitudinal section, for example with wide support surface in the bearing housing 6 and with small support surface in the guide vane bearing ring 10. Obviously the use of other known spring types such as for example elastomer element, sponge-like fabrics and similar resilient elements is likewise possible. An undercut 41, which in the turbine housing 5 is formed with open edge to the guide vane cover ring 12, is fluidically connected with an inlet channel 9, so that a part of the hot exhaust gas can enter the undercut 41 and thus also heats the guide vane cover ring 12 from "behind". Through its wavy shape the wavy ring 32 in this case secures the fluidic connection in that it positions the guide vane cover ring 12 radially spaced from the turbine housing 5. The guide vane cover ring 12 is thus subjected to the temperature of the medium or the exhaust gas on both sides, as a result of which uneven deformation of the guide vane cover ring 12 is prevented and thus the play between the guide vanes 8 and the guide vane cover ring 12 can be selected smaller. All mentioned spring elements can be designed closed or segmented.

Figure 18:
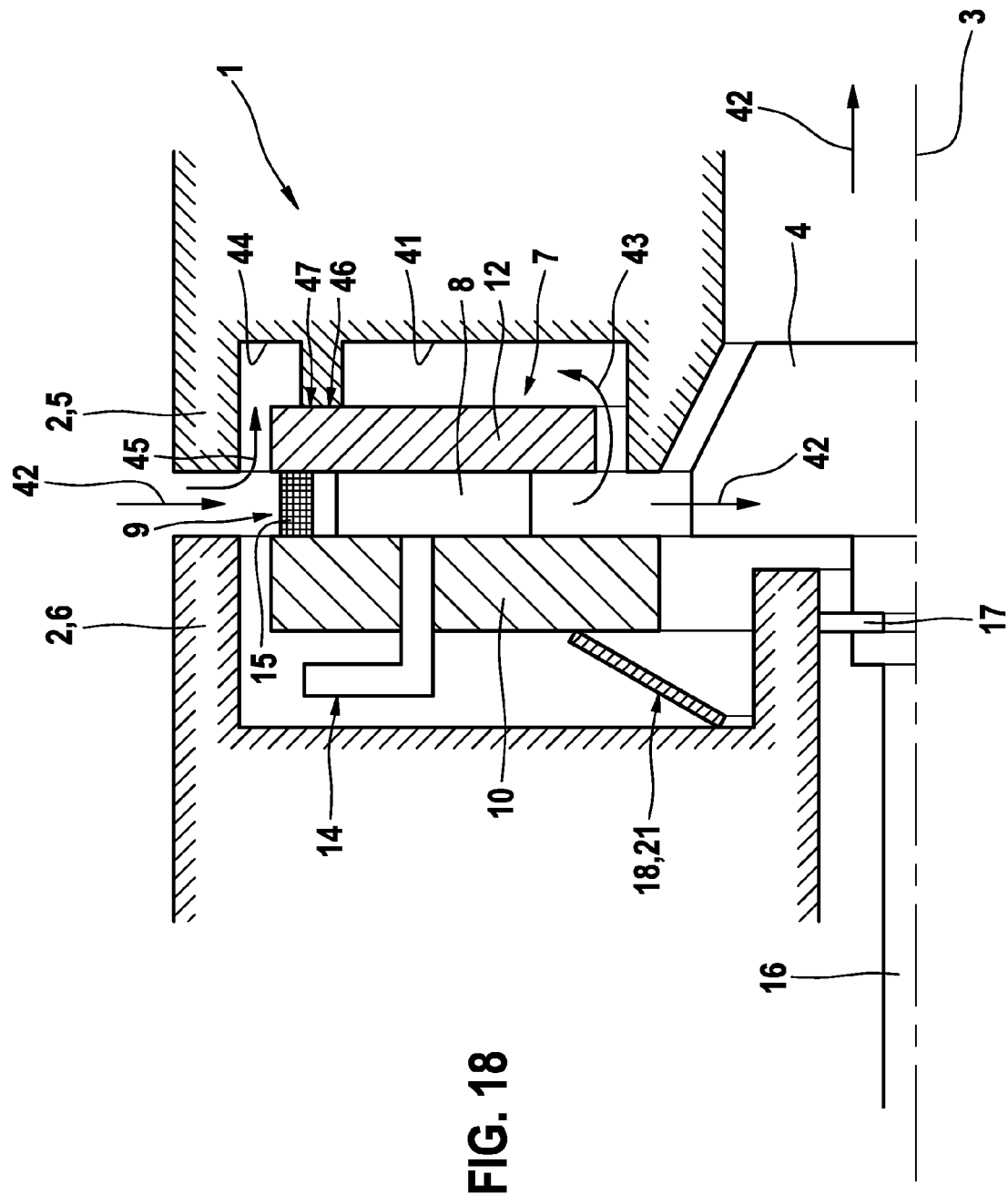

FIG. 18 shows a further exemplary embodiment of the turbine 1 in a simplified representation. In this exemplary embodiment an axial preload is generated by means of the axial spring element 18, as for example also shown in FIG. 4. Likewise shown is the undercut 41, which can be sub-jected to an inflow downstream of the guide vanes 8 as indicated by an arrow 43. Furthermore, a second undercut 44 is provided which is formed/arranged radially spaced from the undercut 41, and which can be subjected to inflow downstream of the guide vanes 8, as indicated by an arrow 45. Between the undercuts 41 and 44 there remains a support region 46 in which the guide vane cover ring 12 is in contact. Between the guide vane cover ring 12 and the support region 46 a seal 47 is advantageously arranged which prevents that medium flow past the guide apparatus 7.

In principle, the embodiments described above can be combined with one another in any way, for example both the guide vane cover ring as well as the guide vane bearing ring are pinned or positioned/held by means of pin connections.

In addition it is possible to arrange/fix at least one axial spacer with pins or pin-like designs of the axial spacer in the guide vane bearing ring and/or in the guide vane cover ring.

FIG. 19 substantially corresponds to FIG. 18, so that in the following merely the differences are explained. FIG. 19 shows a preferred embodiment of the turbine 1, where the line of flux of the axial preload, shown as a line 48 in FIG. 19, substantially runs parallel to the rotational axis 3 of the turbine rotor 4. To this end, the axial spring element is arranged in such a manner that it contacts the guide apparatus 7 or the guide vane bearing ring 10 in an axial spring contact region 52 which substantially lies on the same radius as the axial spacer 15. In the present exemplary embodiment the substantially circle-cylindrical axial spacer 15 with its longitudinal axis or its rotational axis lies on the radius $r\_m$ (pitch circle radius) to the rotational axis 3, as shown by an interrupted line 49. Similar applies to the further axial spacers arranged over the circumference which are not shown here. Because of this, the line of flux (line 48) from the axial spring element 18 is substantially directed axially or parallel to the rotational axis 3 of the turbine rotor 4 through the guide vane bearing ring 10 onto the axial spacer 15. The support region 46, which forms an axial contact region 53 of the housing 2 for the guide apparatus 7 is likewise arranged substantially at the same height or on the same radius as the axial spacer 15, so that the line of flux (line 48) continues to run from the axial spacer 15 via the guide vane cover ring 12 substantially axially or parallel to the rotational axis 3 of the turbine rotor 4 into the housing 2.

On the whole, the line of flux (line 48) thus runs substantially axially or parallel to the rotational axis 3 through the guide apparatus 7. This has the advantage that the elements of the guide apparatus 7, particularly the guide vane cover ring 12 and the guide vane bearing ring 10, particularly in the case of unfavourable transient conditions, are not deformed.

If advantageously instead of the disc spring 21 or a plurality of axial spring elements 18, such as for example the coil springs 39, are provided, these are arranged and orientated aligned with the spacers 15, that is in the imagined extension of the spacers 15. Because of this, stresses and deformations in circumferential direction in the guide vane bearing ring are avoided.

Furthermore, two radii $r\_i$ and $r\_a$ are shown in FIG. 19 by means of interrupted lines 50 and 51 respectively, wherein the radius $r\_a$ is larger and the radius $r\_i$ is smaller than the radius $r\_m$ of the spacers 15. The radii $r\_i$ and $r\_a$ define a line of flux flow range, characterized by a double arrow 54, within which the line of flux (line 48) is to run. Practically, the line of flux and the (pitch circle) radii (to the rotational axis 3), on which the different elements (axial spacer 15, axial spring element 18 and axial spring contact region 52 and support region 46 or axial contact region 53) or the respective contact regions are each arranged between the elements, each only deviate by 20% from the radius r_m in both directions.

Instead of the disc spring 21, as shown in FIG. 18, the heat shield 37 known from FIG. 15 is provided in FIG. 19, which is of a disc spring design, while its spring force is substantially smaller than that of the disc spring 21 and merely serves for sealing.

The invention claimed is:

1. An exhaust gas turbocharger, comprising:
 a turbine rotor rotatably mounted in a housing about a rotation axis, which is associated with guide apparatus defining a radial inlet channel, wherein the turbine rotor is driven by a medium in the inlet channel, wherein the guide apparatus comprises a guide vane bearing ring, a plurality of guide vanes radially surrounding the turbine rotor and located in the inlet channel, and a guide vane cover ring, wherein the inlet channel is axially delimited by the guide vane bearing ring and the guide vane cover ring, wherein the guide vane bearing ring and the guide vane cover ring are mounted axially and radially moveably relative to each other and to the housing for material relaxation; and
 wherein the guide apparatus is subjected to an axial preload, and wherein a line of flux of the axial preload runs through the guide apparatus substantially parallel to the rotational axis of the turbine rotor.

2. The turbocharger according to claim 1, wherein the guide vane bearing ring and the guide vane cover ring each lie in an axial depression of the housing.

3. The turbocharger according to claim 2, wherein the axial depression for the guide vane bearing ring is formed in a bearing housing and the axial depression for the guide vane cover ring is formed in a turbine housing.

4. The turbocharger according to claim 3, wherein the turbine housing includes an undercut opening axially adjacent to the guide vane cover ring and in fluidic communication with the inlet channel.

5. The turbocharger according to claim 1, wherein the guide apparatus includes an axial play between at least one of the guide vane bearing ring and the housing, and the guide vane cover ring and the housing.

6. The turbocharger according to claim 1, wherein the housing includes at least one of a first housing part defining a turbine housing and a second housing part defining a bearing housing.

7. The turbocharger according claim 1, further comprising at least one axial spring element for providing the axial preload.

8. The turbocharger according to claim 7, wherein the axial spring element is axially arranged between at least one of the guide vane bearing ring and the housing, and the guide vane cover ring and the housing.

9. The turbocharger according to claim 7, wherein the axial spring element is at least one of a helical spring, a coil spring, a disc spring, an O-ring and a C-ring.

10. The turbocharger according to claim 1, further comprising at least one radial spring element for providing a radial preload on the guide apparatus.

11. The turbocharger according to claim 1, further comprising at least one radial-axial spring element for generating at least one of the axial preload and a radial preload.

12. The turbocharger according to claim 1, wherein at least one axial spacer is provided between the guide vane bearing ring and the guide vane cover ring.

13. The turbocharger according to claim 12, wherein the axial spacer is arranged on at least one of the guide vane bearing ring and the guide vane cover ring.

14. The turbocharger according to claim 12, wherein the axial spacer is structured unitarily with at least one of the guide vane bearing ring and the guide vane cover ring.

15. The turbocharger according claim 12, wherein at least one axial spring contact region of the guide apparatus substantially lies on the same radius as the axial spacer.

16. The turbocharger according to claim 15, wherein the axial spring contact region is arranged aligned with the axial spacer.

17. The turbocharger according to claim 15, wherein at least one axial contact region of the housing for the guide apparatus lies substantially on the same radius as at least one of the axial spacer and the at least one axial spring contact region of the guide apparatus.

18. The turbocharger according to claim 15, wherein the line of flux of the axial preload deviates by 20% or less from the radius, on which the axial spacer lies, in both directions.

19. The turbocharger according to claim 1, wherein at least one of the guide apparatus, the guide vane bearing ring and the guide vane cover ring comprise at least one pin connection for at least one of aligning and positioning on the housing.

20. The turbocharger according to claim 19, wherein the pin connection comprises at least one pin, which is inserted in a pin reception of the guide apparatus and the housing.

21. The turbocharger according to claim 20, wherein at least one the pin reception is structured as an elongated hole.

22. The turbocharger according to claim 21, wherein the elongated hole in its longitudinal extension is orientated radially or axially.

23. The turbocharger according to claim 20, wherein the at least one pin is orientated axially or radially.

24. The turbocharger according to claim 20, wherein the at least one pin defines an axial spacer provided between the guide vane bearing ring and the guide vane cover ring.

25. An exhaust gas turbocharger, comprising:
 at least one compressor operationally connected mechanically to a turbine rotor, wherein the turbine rotor is rotatably mounted in a housing about a rotation axis, which is associated with a guide apparatus forming a radial inlet channel, wherein the guide apparatus includes a guide vane bearing ring, a plurality of guide vanes radially surrounding the turbine rotor and located in the inlet channel and a guide vane cover ring, wherein the inlet channel is axially delimited by the guide vane bearing ring and the guide vane cover ring, and the guide vane bearing ring and the guide vane cover ring are moveably mounted at least one of axially and radially relative to each other and to the housing to facilitate material relaxation;
 at least one axial spacer provided between the guide vane bearing ring and the guide vane cover ring; and
 wherein the guide apparatus is subjected to an axial preload, and wherein a line of axial preload flux runs through the guide apparatus substantially parallel to the rotational axis of the turbine rotor.

26. A turbine for an exhaust gas turbocharger, comprising:
 a housing;
 a turbine rotor rotatably mounted in the housing about a rotation axis;
 a guide apparatus mounted in the housing and defining a radial inlet channel for a medium to drive the turbine rotor, the guide apparatus including a guide vane bearing ring, a plurality of guide vanes radially surrounding the turbine rotor and disposed in the inlet channel, and a guide vane cover ring, wherein the inlet channel is axially delimited by the guide vane bearing ring and the guide vane cover ring;

wherein the guide vane bearing ring and the guide vane cover ring are mounted axially and radially moveably relative to each other and to the housing for material relaxation; and wherein the guide apparatus is subjected to an axial preload, and wherein a line of flux of the axial preload runs through the guide apparatus substantially parallel to the rotational axis of the turbine rotor.

* * * * *